US005217551A

United States Patent [19]

Nobile et al.

[11] Patent Number: 5,217,551

[45] Date of Patent: Jun. 8, 1993

[54] MAILING MACHINE INCLUDING A PROCESS FOR SELECTIVELY MOISTENING ENVELOPES FED THERETO

[75] Inventors: John R. Nobile, Fairfield; Richard P. Schoonmaker, Wilton, both of Conn.

[73] Assignee: Pitney Bowes Inc., Stamford, Conn.

[21] Appl. No.: 783,584

[22] Filed: Oct. 28, 1991

[51] Int. Cl.[5] .............................. B32B 31/12

[52] U.S. Cl. .............................. 156/64; 156/204; 156/364; 156/366; 156/368; 156/442.1; 156/442.2; 118/703; 271/258

[58] Field of Search .................. 156/441.5, 442, 442.1, 156/442.2, 363, 364, 366, 368, 64, 204; 118/703; 271/257, 258

[56] References Cited

U.S. PATENT DOCUMENTS

| | | | |
|---|---|---|---|
| 3,989,574 | 11/1976 | Evans | 156/368 X |
| 4,123,950 | 11/1978 | Schubert | 156/442 X |
| 4,450,037 | 5/1984 | Gavronsky | 156/442.2 X |
| 4,736,937 | 4/1988 | Okunda et al. | 271/258 X |
| 4,831,273 | 5/1989 | Ross et al. | 271/258 X |
| 4,935,078 | 6/1990 | Bergman et al. | 156/441.5 X |
| 5,088,442 | 2/1992 | Joson et al. | 156/442.2 X |

*Primary Examiner*—David A. Simmons
*Assistant Examiner*—Mark A. Osele
*Attorney, Agent, or Firm*—Donald P. Walker; Melvin J. Scolnick

[57] ABSTRACT

In a mailing machine base including structure for feeding an envelope, having a body and a flap, in a downstream path of travel, and including structure for deflecting the flap, a process for selectively guiding an envelope into and out of engagement with the flap deflecting structure, the process comprising the steps of, providing a baffle upstream from the flap deflecting structure, providing electromechanical structure for moving the baffle, providing a microprocessor for controlling the baffle moving structure, providing a resettable timer having a predetermined time out time interval, operating the baffle moving structure to move the baffle into the path of travel for guiding an envelope fed therein out of engagement with the flap deflecting structure and operating the baffle moving structure to move the baffle out of the path of travel for the time interval for guiding an envelope fed in the path of travel during the time interval into engagement with the flap deflecting structure.

9 Claims, 5 Drawing Sheets

MAILING MACHINE INCLUDING A PROCESS FOR SELECTIVELY MOISTENING ENVELOPES FED THERETO

BACKGROUND OF THE INVENTION

This invention is generally concerned with a mailing machine including a process for selectively moisten envelopes fed thereto, and more particularly with a mailing machine base including a process for selectively guiding envelopes toward and away from envelope moistening and sealing structure.

As shown in U.S. Pat. No. 4,450,037 for an Envelope Flap Sealing Device, issued May 22, 1984 to German Gavronsky and assigned to the assignee of the present invention, it is known in the art to provide a mailing machine comprising envelope flap moistening and sealing structure which includes a plurality of rollers for transporting an envelope in a downstream path of travel, a blade extending into the path of travel for separating the flap of an envelope fed thereto from the body of the envelope, a brush for moistening the glue bearing surface of the envelope flap and structure for guiding the flap into sealing relationship with the envelope body. In addition the '037 Patent disclosures the provision of manually operable structure for selectively guiding an envelope either into or out of engagement with the flap separating blade and thus into or out of moistening relationship with the flap moistening brush. To that end, the flap moistening and sealing structure of the '037 Patent includes a cam which is manually movable between two positions, a cam follower located upstream from the separating blade and mounted for vertical movement in response to movement of the cam, a spring which is biased for urging the cam follower upwardly into engagement with the cam, and a baffle pivoted to the cam follower and extending downstream therefrom and across the path of travel of envelopes fed to the flap separating blade. As thus constructed and arranged, when the cam is manually located in one of the positions thereof, the spring urges the cam follower upwardly for locating the upstream end of the baffle above the path of travel, whereupon an envelope fed downstream in the path of travel toward the flap separating blade is fed beneath the baffle and guided thereby into engagement with the flap separating blade, which, in turn, guides the envelope flap into engagement with the flap moistening brush. On the other hand, when the cam is manually located in the other position thereof, the cam follower is urged downwardly thereby, against the force exerted by the spring, for locating the upstream end of the baffle in the path of travel, whereupon an envelope fed downstream in the path of travel toward the flap separating blade is deflected by the baffle over the flap separating blade and moistening brush, and thus out of engagement with the blade and out of moistening relationship with the brush.

Customer feedback concerning the manual operating characteristics of envelope flap moistening and sealing structures, of the type disclosed in the above U.S. Pat. No. 4,450,037, has established that such structures are perceived to be inconvenient and awkward to operate, due to the need to manually move mechanical components against a force exerted by a spring. In addition, it has been found that operators often use the mailing machine in the envelope flap moistening mode of operation and forget to return the manually movable cam to the non-flap-moistening position, wherein the baffle is located for guiding envelopes out of engagement with the flap deflecting blade. Whereupon a subsequent operator who assumes the machine is in the non-flap-moistening mode of operation may feed a sealed envelope through the machine with the result that the envelope is torn open by the flap deflecting blade.

Accordingly:

an object of the invention is to provide a mailing machine including improved moistening and sealing apparatus;

another object is to provide a mailing machine including improved apparatus for selectively moistening and sealing envelopes;

another object is to provide a mailing machine base including apparatus for selectively guiding envelopes toward and away from envelope flap moistening and sealing apparatus; and another object is to provide a mailing machine including an improved process for selectively guiding envelopes into and out of engagement with envelope flap deflecting structure.

SUMMARY OF THE INVENTION

In a mailing machine base, including means for feeding an envelope, having a body and a flap, in a downstream path of travel, and including means for deflecting the flap, a process for selectively guiding an envelope into and out of engagement with the flap deflecting means, the process comprising the steps of, providing a baffle upstream from the flap deflecting means, providing electromechanical means for moving the baffle, providing a microprocessor for controlling the baffle moving means, providing a resettable timer having a predetermined time out time interval, operating the baffle moving means to move the baffle into the path of travel for guiding an envelope fed therein out of engagement with the flap deflecting means, and operating the baffle moving means to move the baffle out of the path of travel for the time interval for guiding an envelope fed in the path of travel during the time interval into engagement with the flap deflecting means.

BRIEF DESCRIPTION OF THE DRAWINGS

As shown in the drawings wherein like reference numerals designate like or corresponding parts throughout the several views.

DESCRIPTION OF THE PREFERRED EMBODIMENTS

Figure 1:
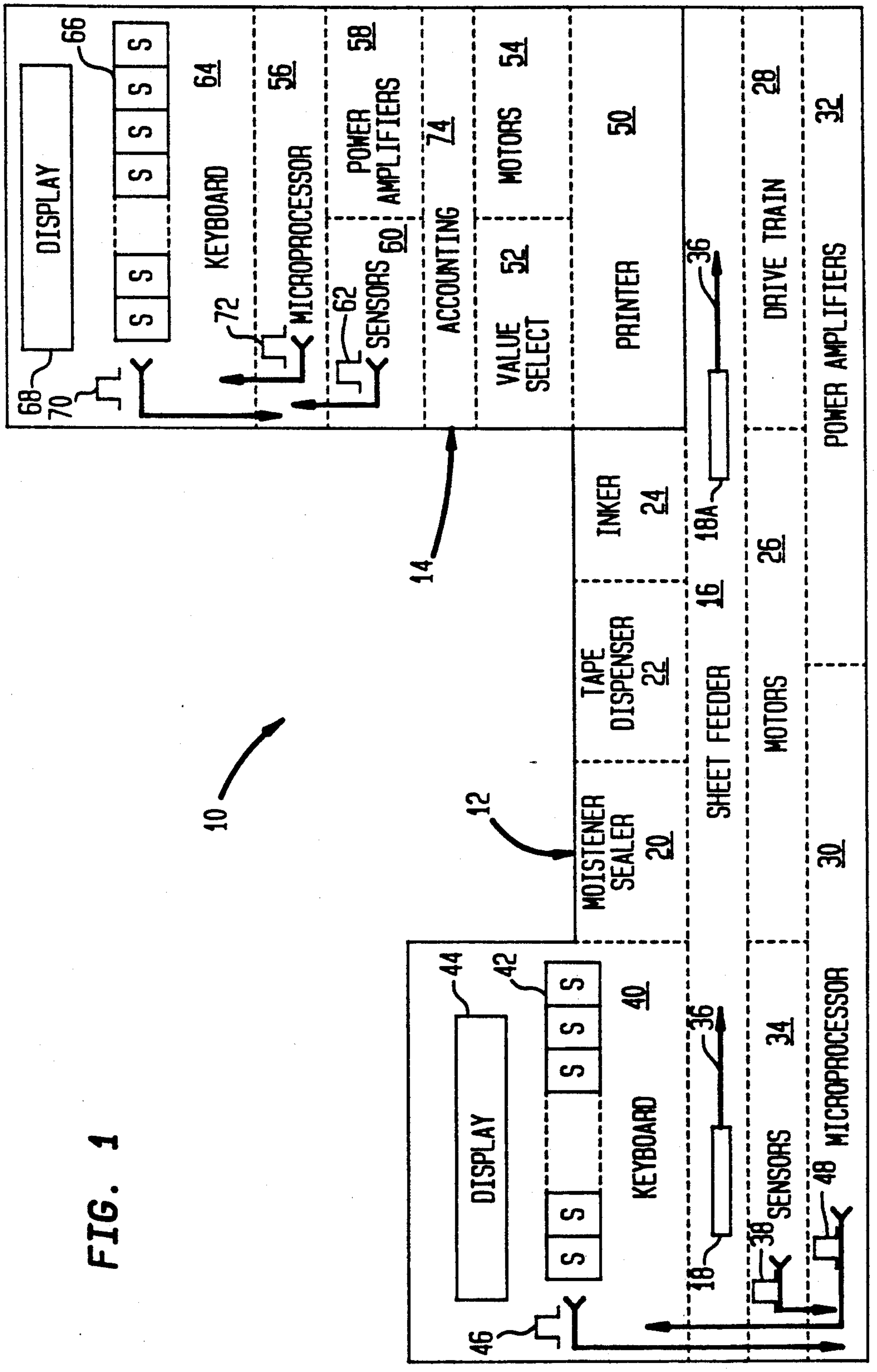
FIG. 1 is a schematic view of a mailing machine according to the invention, including improved apparatus for selectively moistening and sealing an envelope.

As shown in FIG. 1, an improved mailing machine 10 according to the invention generally includes an improved mailing machine base 12, and includes a conventional postage meter 14 which is suitably removably connected to the base 12.

The mailing machine base 12 (FIG. 1) preferably comprises conventional sheet feeding structure 16, including an elongate horizontally-extending deck 17 (FIG. 2), an upright registration fence 17A extending alongside of and longitudinally of the length of the deck 17, and a plurality of rollers 17B, which may be one or more belts, or the like, for feeding successive sheets 18 on the deck 17 through the machine 10 (FIG. 1). Without departing from the spirit and scope of the invention, a given a sheet 18, may be a cut tape 18A, a card, or folded or unfolded letter, or a sealed or unsealed envelope 18B (FIG. 2) having a body 19, and having a flap 19A which bears a strip of moisture soluble glue 19B. And, the envelope body 19 may be stuffed with one or more cards, folded or unfolded letters, invoices, remittance slips or return envelopes, or other sheets 18. In addition, the mailing machine base 12 (FIG. 1) preferably comprises improved envelope moistening and sealing structure 20, as hereinafter discussed in greater detail, including a suitable source of supply of water. Moreover, the base 12 preferably includes conventional cut tape dispensing structure 22, including a suitable receptacle for receiving and storing a stack of cut tapes 18A, and including conventional structure for feeding the cut tapes 18A one at a time from the receptacle. And, the base 12 preferably includes conventional inking structure 24, such as a suitable source of supply of ink, which may be a reservoir of ink or an ink saturated roller, and such as one or more rollers associated therewith for transferring ink therefrom to printing structure of a postage meter 14 removably connected to the base 12. Still further, the mailing machine base 12 preferably includes one or more conventional motors 26, which are suitably connected to the sheet feeding structure 16, for operation thereof, and to a conventional drive train 28 which is suitably constructed and arranged for transferring motive power to a postage meter 14 removably connected to the base 12. Moreover, for controlling the mailing machine base 12, the base 12 preferably includes a conventional microprocessor 30, one or more power amplifiers 32 which are respectively connected between the microprocessor 30 and a different motor 26. Further, for controlling the base 12, the base 12 includes a plurality of conventional sensors 34 which are suitably located relative to one or more components of the sheet feeding structure 16, cut tape dispensing structure 22, inking structure 24, motors 26, drive train 28 and the path of travel 36 of respective sheets 18 fed through the machine 10, for providing signals, such as the signal 38, to the microprocessor 30 which are indicative of the angular velocity of the respective motors 26 or of selected components of the drive train and sheet feeding structures, 16 and 28, are indicative of one or more positions of selected components of the structures 16, 22, 24, 26 and 28, the available supply of water or ink, as the case may be, in the moistening and inking structures, 20 or 24, and are indicative of one or more positions of a given sheet 18, including a given cut tape 18A, in the path of travel 36. Still further, for controlling the mailing machine base 12, the base 12 additionally comprises a conventional keyboard 40, including a plurality of switches 42 and a suitable display 44 which are conventionally electrically connected to the microprocessor 30 for providing thereto conventional signals, such as the signal 46, for causing the microprocessor 30 to control the base 12, and receiving therefrom conventional signals, such as the signal 48, for driving the display 44. And, the microprocessor 30 is conventionally programmed for, inter alia, responding to signals 38 received from the sensors 34, and to signals 46 received from the keyboard 40 due to manual activation of the switches 42, for timely causing operation of the motors 26, and thus of the drive train and sheet feeding structures, 16 and 28, thereby causing respective sheets 18, including cut tapes 18A, to be transported by the sheet feeding structure 16 through the machine 10, and for timely causing the printing structure of the postage meter 14 to print postage indicia, as hereinafter described, on the respective sheets 18.

The postage meter 14 (FIG. 1) preferably comprises conventional postage indicia printing structure 50, such as a conventional rotary printing drum, having a suitable indicia printing die and including a drive shaft, or such as a conventional impact printer, having suitable platen and printing die members, and constructed and arranged for interfacing with the drive train 28 of the mailing machine base 12 when the postage meter 14 is removably connected thereto. For changing the postage value included in the postage indicia, the postage meter 14 additionally includes conventional value selection structure 52, such as a plurality of conventional printing wheels and a drive train therefor, and also includes one or more motors 54, such as stepper motors, which are respectively coupled to the drive trains of the value selection structure 52. In addition, for controlling the postage meter 14, and thus the postage value changing structure 52, the postage meter 14 includes a conventional microprocessor 56, and includes one or more power amplifiers 58 which are respectively connected between the microprocessor 56 and a different motor 54. Further, for controlling the postage meter 14, the meter 14 also includes a plurality of conventional sensors 60 which are suitably located relative to one or more components of the printing structure 50, value selection structure 52, motors 54 and the path of travel 36 of respective sheets 18, including cut tapes 18A, fed through the machine 10, for providing signals, such as the signal 62, to the microprocessor 56 which are indicative of one or more positions of selected components of the structures 50, 52 and 54, and of one or more positions of a given sheet 18, including a given cut tape 18A, in the path of travel 36. Still further, for controlling the postage meter 14, the meter 14 additionally comprises a conventional keyboard 64, including a plurality of suitable switches 66 and a suitable display 68 which are conventionally electrically connected to the microprocessor 56 for providing thereto conventional signals, such as the signal 70, for causing the microprocessor 56 to control the postage meter 14, and for receiving therefrom conventional signals, such as the signal 72, for driving the display 68. Moreover, for controlling the postage meter 14, the meter 14 includes conventional accounting structure 74. The accounting structure 74 is electrically connected to the microprocessor 56 for communicating therewith, and includes, inter alia, data stored therein which corresponds to the current total value of postage available for printing by the meter 14, the current total value of postage printed by the meter 14 and the serial number of the meter 14. And, for controlling the meter 14, the microprocessor 56 is conventionally programmed for, inter alia, responding to value selection signals 70 received from the keyboard 64, due to manual actuation of the switches 66, for causing the microprocessor 56 to energize the motors 54, thereby causing the value selection structure 52 to position the print wheels to print a postage value corresponding to the value selection signals 70, and for causing the microprocessor 56 to access the accounting structure 74 to determine whether or not sufficient total postage is available for printing and, if so, to deduct therefrom an amount corresponding to the value selection signals 70 and to add the same amount to the total value printed, and, in addition, for the causing the printing structure 50 to be unlocked to permit the printing of single postage indicia, including the amount corresponding to the value selection signals 70, under the control of the postage meter base 12.

Figure 2:
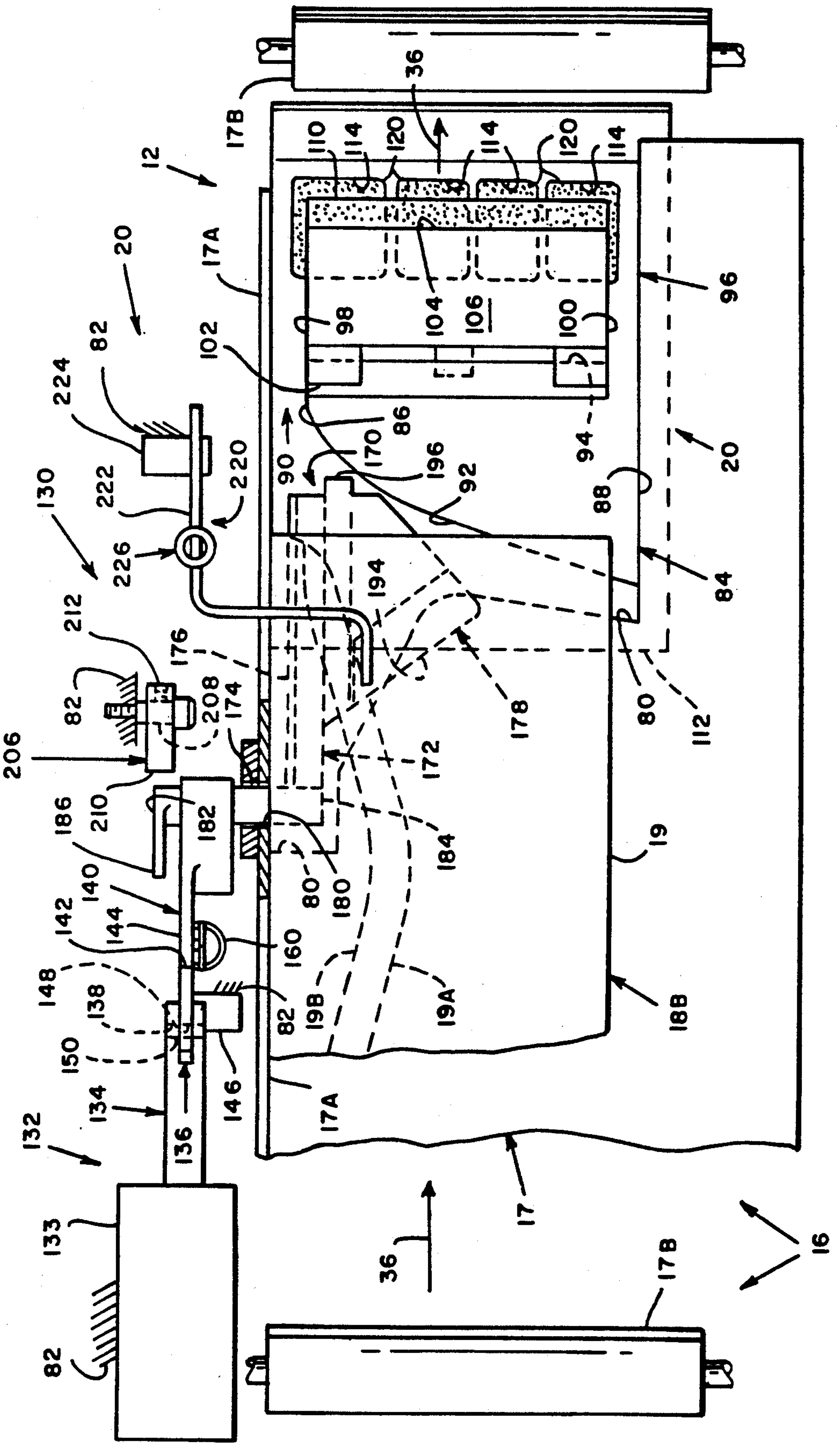
FIG. 2 is a partially fragmentary, and partially schematic, plan view of the apparatus according to the invention, showing structure for selectively guiding an envelope either toward or away from envelope flap moistening and sealing apparatus.
Figure 3:
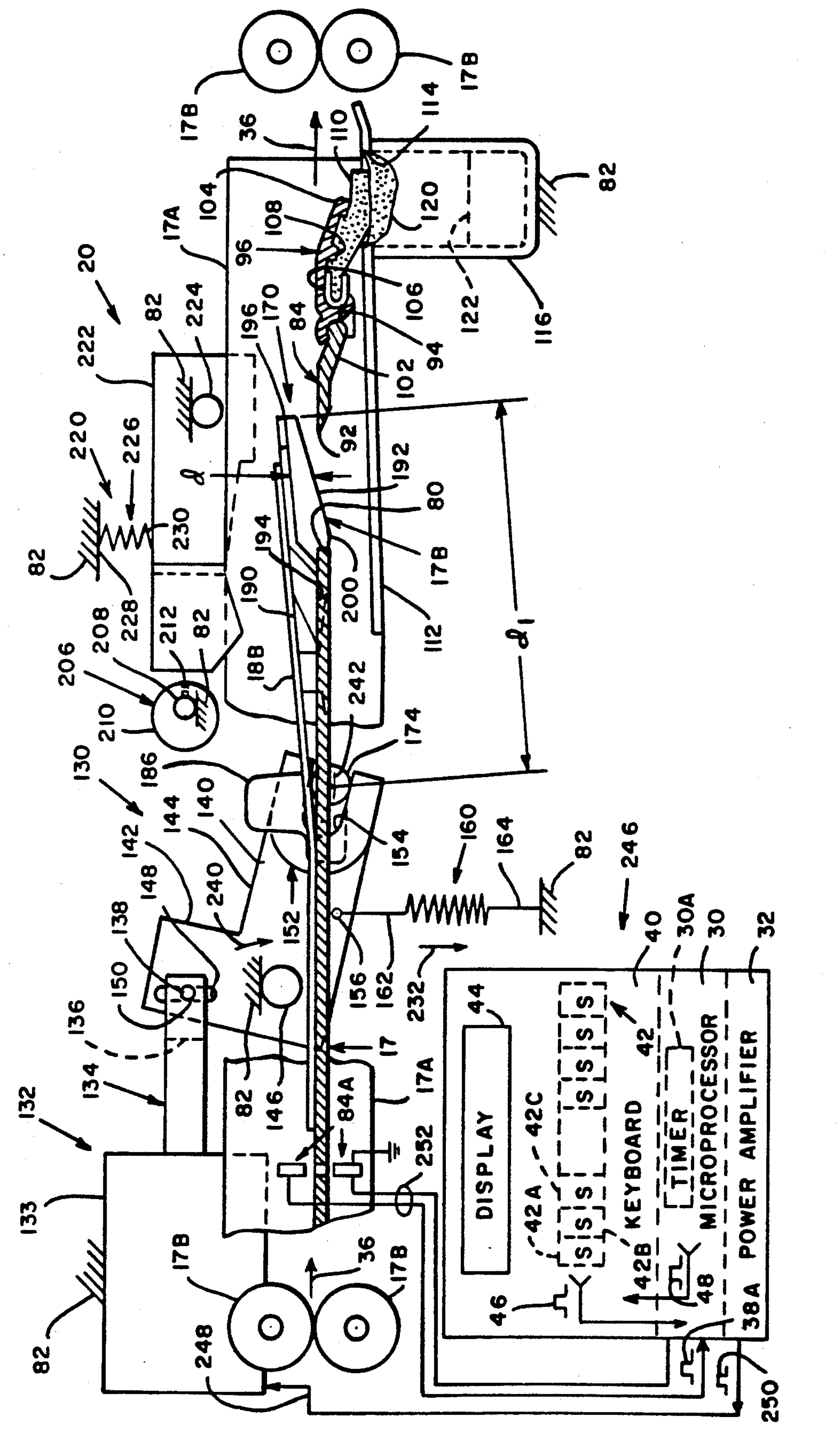
FIG. 3 is a elevation view of the apparatus of FIG. 2, showing the selection structure thereof positioned for guiding an envelope away from the flap moistening structure.
Figure 4:
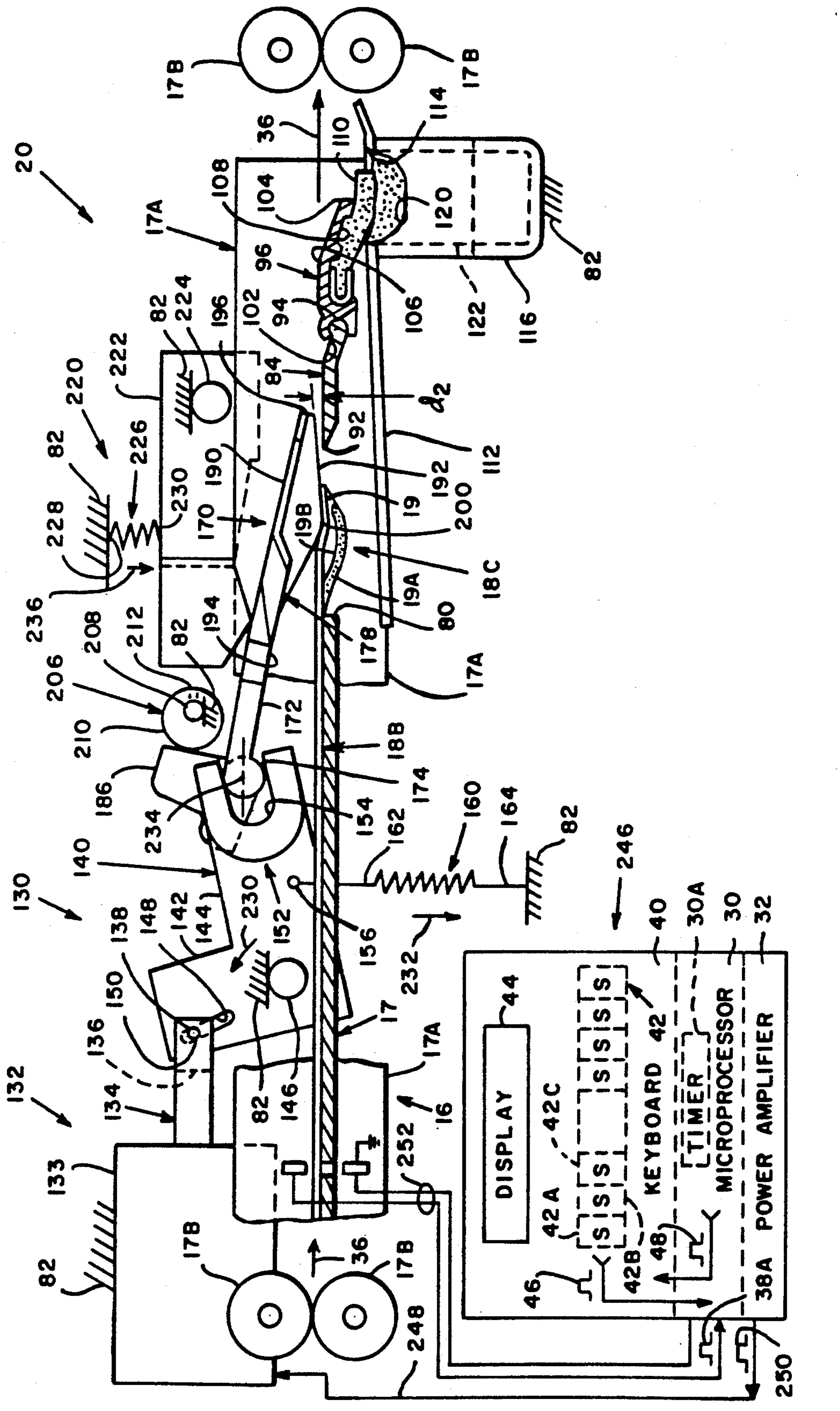
FIG. 4 is an elevation view of the apparatus of FIG. 2, showing the selection structure thereof positioned for guiding an envelope toward the flap moistening structure.

As shown in FIG. 2, according to the invention the moistening and sealing structure 20 preferably includes an elongate aperture 80 formed in the sheet feeding deck 17. The aperture 80 preferably extends downstream alongside of the registration fence 17A. And, the moistening and sealing structure 20 preferably comprises framework 82 for supporting the various components thereof including an elongate, envelope flap deflecting, blade 84, which horizontally extends into the deck aperture 80 so as to define a downstream-extending extension of the deck 17. The blade 84 has an inner edge 86 and an outer edge 88, which respectively extend in the direction of the path of travel 36. The inner edge 86 is preferably spaced apart from the registration fence 17A so as to define therewith an opening 90 therebetween. And, the blade 84 has an elongate, longitudinally-extending, upstream, leading, knife edge 92 and an elongate, longitudinally-extending downstream, trailing edge 94, which respectively extend between the inner and outer edges, 86 and 88. Further, the moistening and sealing structure 20 preferably includes an elongate generally rectangularly-shaped arm 96, having opposed inner and outer edges, 98 and 100. The inner edge 98 preferably extends downstream in alignment with the inner blade edge 86 and in the direction of the path of travel 36, whereby the arm's inner edge 98 is spaced apart from the registration fence 17A so as to define therebetween an elongation of of the opening 90. In addition, the arm 96 (FIG. 4) includes opposed, longitudinally-extending, leading and trailing edges, 102 and 104, which extend between the arm's inner and outer edges, 98 (FIG. 2) and 100. Moreover, the arm 96 has an upper surface 106, and the leading edge 102 (FIG. 4) of the arm 96 is conventionally hingedly connected to the downstream, trailing, edge 94 of the flap deflecting blade 84 in a manner such that the arm's upper surface 106 extends substantially horizontally downstream from the blade 84, and such that the trailing edge 104 of the arm 96 is resiliently urged downwardly. In addition, the arm 96 has an irregularly shaped lower surface 108 which is conventionally constructed and arranged for holding, in a manner such that it extends downstream from beneath the arm's trailing edge 104, an elongate, generally rectangularly-shaped, envelope flap moistening, pad 110, made of a suitable fluid wicking material. Further, the moistening and sealing structure 20 includes an elongate, envelope flap guiding, wall 112. Preferably, the wall 112 extends outwardly from the registration fence 17A and is suitably spaced beneath the blade and arm, 84 and 96, so as to angularly extend gradually upwardly therebeneath as it extends downstream thereunder, for guiding envelope flaps 19A downstream beneath the blade 84 and arm 96 and into moistening engagement with the flap moistening pad 110. Preferably, the flap guiding wall 112 extends downstream, as hereinbefore discussed, beyond the flap moistening pad 110, and has formed therein a plurality of rectangularly-shaped openings 114 (FIG. 2) arranged in a row, beneath the pad 110, which extends parallel to the longitudinal length of the pad 110. In addition, the moistening and sealing structure 20 preferably includes a conventional water receptacle 116 (FIG. 3) which is suitably connected to the framework 82 beneath the openings 114. Further, the structure 20 includes a conventional moistening pad 120, which is made of a suitable wicking material dimensioned to be immersed in a quantity of water 122 stored in the receptacle 116 and to extend through the wall openings 114. As thus constructed and arranged, the moistening pad 120 transfers water 122 by capillary action, from the receptacle 116, through the wall openings 114 to the flap moistening pad 110.

The moistening and sealing structure 20 (FIG. 2) additionally includes one or more rollers 17B of the sheet feeding structure 16, which are located upstream of the flap deflecting blade 84, for feeding respective envelopes 18B toward the flap deflecting blade 84. And the structure 20 includes one or more additional rollers 17B of the sheet feeding structure 16, which are located downstream of the flap moistening pad 110, for feeding respective envelopes 18B away from the flap moistening pad 110. Preferably, the rollers 17B located downstream of the flap moistening pad 110 are conventionally constructed and arranged for performing the function of urging the moistened strip of glue 19B borne by the envelope flap 19A into sealing relationship with the envelope body 19, for sealing the envelope 18B. In addition, the moistening and sealing structure 20 includes electromechanical structure 130 for selectively guiding envelopes 18B toward and away from the flap deflecting blade 84 and thus toward and away from the flap moistening pad 110. To that end, the moistening and sealing structure 20 preferably includes a conventional solenoid 132, which is suitably connected to the framework 82 upstream of the blade 84 and inboard of registration fence 17A, it being noted that the deck 17 extends outwardly of the fence 17A. The solenoid 132 includes an elongate coil 133 and a plunger, 134. The plunger 134 preferably includes an outer, yoke-shaped, end portion 136 having an aperture 138 formed transversely therethrough. In addition, the envelope guiding structure 130 comprises a substantially L-shaped baffle positioning, member 140 (FIG. 3), including an upwardly-extending leg 142 and a laterally-extending leg 144. Preferably, the positioning member 140 is conventionally pivotally attached to the framework 82, as by means of a pin 146 (FIG. 2) which is located upstream of the flap deflecting blade 84 and inboard of the registration fence 17A, such that the laterally-extending leg 144 is located inboard of the fence 17A and extends upstream from the pin 146. In addition, the upwardly oriented leg 142 (FIG. 3) preferably includes an elongate, uprightly-oriented slot 148 formed therein. Further the solenoid plungers' outer end portion 136 is conventionally connected to the positioning member's leg 142 by means of a suitable pin 150. The pin 150 extends through the solenoid plungers' aperture 138 and through the leg's slot 148, in a manner such that the solenoid plunger 134 and the upwardly oriented leg 142 are movable relative to one another. Still further, the positioning member's laterally-extending leg 144 includes an outer, yoke-shaped free end portion 152 which includes, a slot 154. And, substantially midway between the pin 146 and slot 154, the positioning member's leg 144 has an aperture 156 formed therein. In addition, the envelope guiding structures 130 includes a conventional spring 160, having one end 162 conventionally secured to the positioning member's leg aperture 156 and having the other end 164 conventionally secured to the framework 82, for biasing the leg 144, and thus the yoke-shaped free end portion 152 thereof, downwardly.

In addition, the envelope guiding structure 130 (FIG. 2) includes a baffle 170 for deflecting envelopes 18B, which are fed toward the flap deflecting blade 84, either into or out of engagement with the blade 84. The baffle 170 includes a generally L-shaped portion 172, having elongate, first and second, legs, 174 and 176, and includes a generally triangularly-shaped portion 178 which extends laterally from one of the baffle legs 176. Preferably, the baffle leg 174 (FIG. 3) is substantially circularly-shaped in transverse cross-section and pivotably positioned Within the positioning member's slot 154, and thus in bearing engagement with the member's yoke-shaped free end portion 152, so as to extend through an elongate, vertically-extending, reinforced aperture 180 (FIG. 2) formed in the registration fence 17A. Thus, the baffle leg 174 extends from the inboard to the outboard side of the fence 17B, for locating the baffle leg 176 in vertical alignment with the aperture 80 and locating the triangularly-shaped baffle portion 178 in overhanging relationship with respect to the deck 17. Moreover, the baffle leg 174 has an inner end 182 and an outer end 184 relative to the registration fence aperture 180. And, the leg 174 has an elongate cam follower portion 186 extending transversely from the leg's inner end 182. Further, the baffle's triangularly-shaped portion 178 includes an upper wall 190 (FIG. 3) and one or more ribs 192 depending from the upper wall 190, and has a leading, knife, edge 194 (FIG. 2) and a trailing edge 196. Preferably, the vertical height "d" (FIG. 3) of each of the ribs 192 initially gradually increases and then gradually decreases as it extends downstream from the leading edge 194 toward the trailing edge 196, so as to form a downwardly extending rib apex 200 located substantially two-thirds of the downstream distance "$d_1$" from the axis of the baffle's leg 174 to the baffle portion's trailing edge 196.

Still further, the envelope guiding structure 130 (FIG. 3) includes an adjustable cam 206 which is eccentrically pivotally attached to the framework 82, as by means of a pivot shaft 208, for engagement and disengagement by the baffle leg's cam follower portion 186. Preferably, the cam 206 is conventionally adjustably positionable on the shaft 208, for locating the cam lobe 210 relative to the baffle leg's cam follower portion 186. To that end, the structure 130 may include a set screw 212 which is threadably mounted in the cam 206 and movable into and out of engagement with the pivot shaft 208 to allow for positioning the cam 206 on the shaft 208. Moreover, the envelope guiding structure 130 includes a resilient stop 220, including an elongate arm 222 which is conventionally pivotably attached to the framework 82, as by means of a pivot shaft 224 located on the inboard side of the registration fence 17A (FIG. 2), so as to extend therefrom, across the fence 17A to the outboard side thereof and into overhanging relationship with the baffle's triangularly-shaped portion 178. In addition, the resilient stop 220 includes a conventional spring 226 (FIG. 3) having one end 228 suitably secured to the framework 82 and the other end 230 suitably secured to the arm 222, for biasing the arm 222 downwardly towards the baffle 170.

As thus constructed and arranged, when the solenoid 132 (FIG. 4) is electrically operated, the solenoid plunger 134 is moved into the coil 133, and the baffle positioning member 140 is pivoted thereby counterclockwise 230, against an increasing, downwardly directed force 232 exerted by the spring 160, as the spring 160 is expanded and energy is stored therein. In addition, as the baffle positioning member 140 pivots counterclockwise 230, the positioning member's yoke-shaped, free end, portion 152 raises the baffle leg 174 to an upper position 234 thereof, wherein the stop arm 222 is disposed in engagement with the baffle's upper wall 190 and the stop spring 226 exerts a downwardly directed force 236 against the baffle wall 190 which urges the baffle leg's cam follower portion 186 into engagement with the cam 206. Accordingly, the resilient stop 220 and cam 206 cooperate with one another for positioning the baffle 170 relative to the deck 17 such that the trailing edge 194 of the baffle's triangularly-shaped portion 178 is elevated thereabove, and thus out of the path of travel 36 of envelopes 18B fed downstream on the deck 17 toward the flap deflecting blade 84, and such that the baffle's downstream edge 196 is positioned a predetermined distance "$d_2$", depending upon the position of the cam lobe 210, above the leading edge 92 of the flap deflecting blade 84, to permit the passage therebetween of an envelope body 19 having a maximum thickness dimension of "$d_2$". In addition, the baffle's rib apex 200 is thereby located for engagement by an envelope 18B fed downstream toward the flap deflecting blade 84, to permit the rib apex 200 to depress the envelope portion 18C passing therebeneath into the deck aperture 80 for positioning the flap 19A below the leading edge 92 of the flap deflecting blade 84 as the envelope 18B is fed into engagement therewith. Whereupon, the blade 84 may deflect the envelope flap 19A downwardly therebeneath for guidance into engagement with the moistening pad 110. Thereafter, when electrical operation of the solenoid 132 (FIG. 3) is discontinued, the energy stored in the spring 160 causes the spring 160 to compress and exert a decreasing, downwardly directed, force, corresponding to the force 232, on the positioning member 140. As the positioning member 140 is thereby pivoted clockwise 240, moving the solenoid plunger 134 out of the coil 133, the positioning member's yoke-shaped, free end, portion 152 lowers the baffle leg 174 to a lower position 242 thereof, wherein the stop arm 222 is disposed out of engagement with the baffle wall 190, the baffle leg's cam follower portion 186 is disposed out of engagement with the cam 206 and the leading edge 194 of the baffle member's triangularly-shaped portion 178 is disposed in engagement with the deck 17. As a result, envelopes 18B which are fed downstream on the deck 17 toward the flap deflecting blade 84 engage the leading edge 194 of the baffle 84 and are guided thereby on to the baffle's upper wall 190. Whereupon the envelopes 18B are fed over the flap deflecting blade 84 and moistening arm 96, and into the nip of the downstream sheet feeding rollers 17B.

For controlling the moistening and sealing structure 20 (FIGS. 3 and 4), and, more particularly, the envelope guiding structure 130, the moistening and sealing structure 20 preferably comprises controlling structure 246 including the microprocessor 30, and including an additional power amplifier 32 which is conventionally electrically connected to the microprocessor 30. Preferably, the additional power amplifier 32 is electrically connected to the solenoid 132, as by means a lead 248, for providing thereto signals, such as the signal 250, under the control of the microprocessor 30, for operation or discontinuance of operation of the solenoid 132. Without departing from the spirit and scope of the invention, the additional power amplifier 32 may be an electromechanical relay, or a simple, solid state, switching device or a more complex integrated circuit. In addition, the controlling structure 246 preferably comprises a plurality of manually operable switches, such as switches 42A, 42B and 42C of the array of switches 42 of the keyboard 40, which are each conventionally connected to the microprocessor 30 for providing a signal thereto, such as the signal 46, when the switches 42A, 42B or 42C are respectively actuated. More particularly, the switch 42A is preferably a "print only" switch which is actuatable for causing discontinuance of operation of the solenoid 134 to permit, for example, sealed envelopes 18B, which are fed downstream on the deck 17, to be fed out of the path of trave 36, and thus past the flap deflecting blade 84 and moistening pad 110. Whereupon the envelopes 18B are fed to the printing structure 50, which is conventionally enabled for printing postage indicia on the envelopes 18B. Further, the switch 42B is preferably a "seal only" switch which is actuatable for causing operation of the solenoid 132, for example, to permit unsealed envelopes 18B, which are fed downstream on the deck 17, to be fed in the path of travel 36 into engagement with the flap deflecting blade 84 and moistening pad 110, and then to the downstream rollers 17B for sealing thereby. Whereupon the envelopes 18B are fed to the printing structure 50, which is conventionally disabled for preventing printing postage indicia on the envelopes 18B. Moreover, the switch 42C is preferably a "print and seal" switch which is actuatable for causing operation of the solenoid 132, for example, to permit unsealed envelopes 18B, which are fed downstream on the deck 17, to be fed in the path of travel 36 into engagement with the flap deflecting blade 84 and moistening pad 110, and then to the downstream rollers 17B for sealing thereby. Whereupon the envelopes 18B are fed to the printing structure 50 which is conventionally enabled for printing postage indicia on the envelopes 17B. Thus the microprocessor 30 is preferably conventionally programmed to respond to actuation of the "print only" switch 42A to enable the printing structure 50 and deenergize the solenoid 132, and to respond to actuation of the "seal only" switch 42B to disable the printing structure 50 and energize the solenoid 132, to respond to actuation of the 37 print and seal" switch 42C to enable the printing structure 50 and energize the solenoid 132.

In addition, for controlling the moistening and sealing structure 20 (FIGS. 3 and 4) and, more particularly the envelope guiding structure 130, the microprocessor 30 is preferably conventionally programmed to commence operation of a suitably programmed, internal, resettable, timer 30A, having a predetermined time out time interval, whenever the solenoid 132 is actuated by either of the "seal only" or "print and seal" switches, 42B or 42C, and to discontinue operation of the solenoid 132 upon the lapse of the predetermined time interval, such as from one to two minutes from commencement of operation of the timer 30A, or if the "print only" switch 42A is actuated. Moreover, the microprocessor 30 is also preferably programmed to discontinue operation of the solenoid 132 at the end of the predetermined time interval unless, during the predetermined time interval, an envelope 18B is fed downstream in the path of travel 36 to the flap deflecting blade 84 and moistening pad 110. Accordingly, the moistening and sealing structure 20 preferably includes additional sensing structure 84A, located upstream in the path of travel 36 from the baffle 178, which is suitably electrically connected to the microprocessor 30 as by means of leads 252, for providing a timer resetting signal, such as the signal 38A, to the microprocessor 30 upon detection of each envelope 18B fed downstream in the path of travel 36. And, the microprocessor 30 is conventionally programmed to cause the timer 30A to be reset in response to the microprocessor 30 receiving, during the each successive time out time interval, each reset signal 38A. Further, the microprocessor 30 is also conventionally programmed to cause discontinuance of operation of the solenoid 132 if the microprocessor 30 does not receive a reset signal 38A from the sensing structure 84A before the end of each time out time interval of the timer 30A, and thus within each successive, predetermined, time out time interval. Accordingly, whenever the mailing machine base 12 is switched to an envelope flap moistening mode of operation thereof, if the "print only" switch 42A is not operated or if successive envelopes 18B are not thereafter fed to the flap separating blade 84 at time intervals of less than the predetermined time interval, then, the baffle member's triangularly-shaped portion 178 will be lowered into engagement with the deck 17 for deflecting envelopes 18B out of the path of travel and thus out of engagement with the flap separating blade 84 and moistening pad 110.

Figure 5:
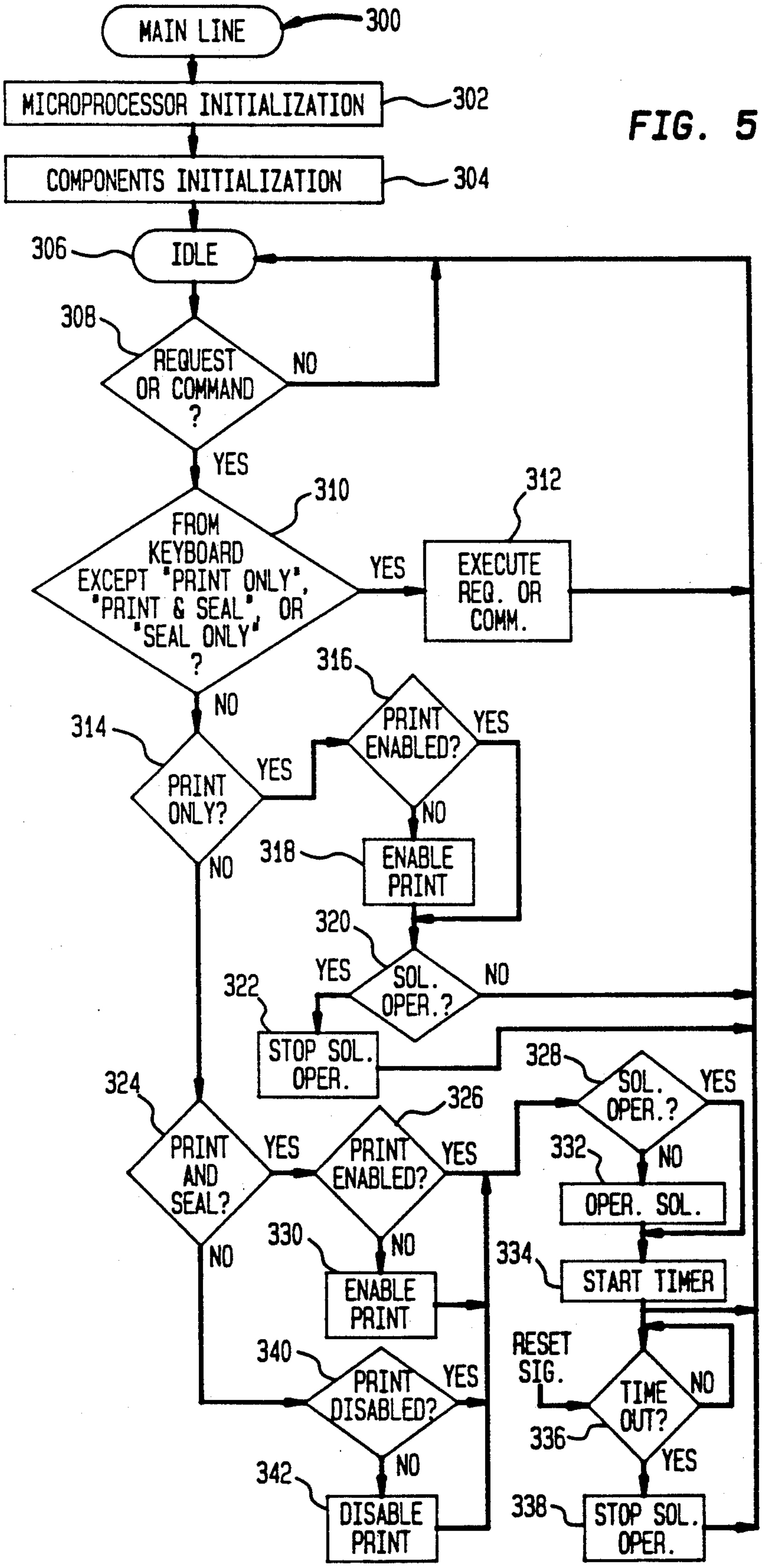
FIG. 5 is a flow chart of a process for operating the apparatus according to the invention.

As shown in FIG. 5, in accordance with the invention the microprocessor 30 is preferably programmed to include a main line program 300, which commences with the step 302 of conventionally initializing the microprocessor 30. Step 302 generally includes establishing the initial voltage levels at the interface ports utilized for receiving data from the various sensors, 34 and 34A, and for controlling the various structures 16, 20, 22, 24, 26, 28, 32 and 44 of the mailing machine base 12, and setting the timers and counters of the microprocessor 30. Thereafter, the microprocessor 30 executes the step 304 of initializing the components of the aforesaid various structures. Step 304 generally entails causing the microprocessor 30 to scan the microprocessor ports connected to the various sensors, 34 and 34A, and, if necessary, to drive the motors 26 and disable the solenoid 134 for causing various components of the structures 16, 20, 22, 24, 26, 28 and 32 to be driven to their respective home positions from which operation thereof, and thus of the mailing machine base 12, may be initiated. Assuming completion of the initialization steps 302 and 304, then, according to the invention, the program 300 enters into an idle loop routine 306 which commences with the step 308 of determining whether or not a request or command has been received from the keyboard 40 (FIG. 1) and, assuming that it has not been received, step 308 (FIG. 5), the program 300 loops to idle, step 306, and reiterates step 308 until a request or command is received. Whereupon, the program 300 implements the step 310 of determining whether or not the request or command is from a keyboard switch 42, (FIGS. 1, 3 and 4) other than one of the "print only", "print plus seal" or "seal only" switches, 42A, 42B or 42C. Assuming that it is, the program 300 (FIG. 5) implements the step 312 of causing the microprocessor 30 to execute the request or command, for example, by causing operation of one or more of the motors 26, power amplifiers 32 and the drive train 28, and of the sheet feeder 16, inking structure 24 and display, depending on the content of the request or command, in consideration of appropriate input signals 38 from the sensors 34. However, assuming that the request or command is from one of the keyboard switches 42A, 42B or 42C, step 310, then, the program 300 implements the step 314 of determining whether or not the "print only" switch 42A has been actuated. Assuming that it has, the microprocessor 30 implement the step 316 of determining whether or not the printing structure 50 is enabled. Assuming the printing structure 50 has not been enabled, step 316, the microprocessor 30 implements the step 318 of causing the printing structure 50 to be enabled, followed by the step 320 of determining whether or not the solenoid 132 is operated. If, however, the printing structure 50 is found to be enabled, step 316, then the microprocessor 30 directly implements the step 320 of determining whether or not the solenoid 132 is operated. Assuming that the solenoid 132 is not operated, step 320, the program 300 loops to idle 306. On the other hand, if the microprocessor 30 determines that the solenoid 132 is operated, step 320, then the microprocessor implements the step 322 of causing the solenoid 132 to be deenergized, followed by returning processing to idle 306. Referring back to step 314, if the microprocessor 30 determines that the request or command is not due to actuation of the "print only" switch 42A, then, the microprocessor 30 implements the step 324 of determining whether or not the request or command is due to actuation of the "print and seal" switch 42C. Assuming that it is, the microprocessor 30 implements the step 326 of determining whether or not the printing structure 50 is enabled, and, assuming that it is, directly implements the step 328 of determining whether or not the solenoid 132 is operated. However, if upon implementing step 326 the microprocessor 30 determines that the printing structure 50 is not enabled, then, the microprocessor 30 implements the step 330 of causing the printing structure 50 to be enabled, followed by the step 328 of determining whether or not the solenoid 132 is operated. Thereafter, if the microprocessor 30 determines that the solenoid 132 is not operated, step 328, the microprocessor 30 implements the successive steps, 332 and 334, of causing the solenoid 132 to be operated, followed by starting the timer 30A. On the other hand, if the microprocessor 30 makes a determination, step 328, that the solenoid 132 is operated, then the microprocessor 30 directly implements the step 334 of starting (resetting) the timer 30A. In either event, after implementing the step 334 of starting the timer 30A, the program 300 enters into a parallel processing mode of operation of both returning processing to idle 306 and implementing a solenoid time out routine commencing with the step 336 of determining whether or not a timer reset signal 38A has been received before the timer 30A times out at the end of a predetermined time interval, of from substantially one to two minutes. Assuming that the microprocessor 30 makes a determination that a reset signal 38A has been received before the end of the time out time interval, due to an envelope 18B having been detected by the sensor 34A, then, the microprocessor 30 implements the step 336 of looping to reset the time out time interval. If, on the other hand, the microprocessor 30 makes a determination that a reset signal 38A has not been received during the time out time interval, then the microprocessor 30 implements the step 338 of causing operation of the solenoid 132 to be discontinued, followed by returning processing to idle 306. Referring back to step 324, if the microprocessor 30 determines that the request or command is not due to actuation of the "print and seal" switch 42C, then the program 300 assumes that the request or command is due to actuation of the "seal only" switch 42B. Whereupon the microprocessor 30 implements the step 340 of determining whether or not the printing structure 50 is disabled. Assuming that a determination is made that the printing structure 50 is disabled, the microprocessor 30 then implements the step 328 of determining whether or not the solenoid 13A is operated, followed by successive implementation of the steps 332, 334, 336 and 338 as hereinbefore discussed. On the other hand, if the microprocessor 30 determines that the printing structure 50 is not disabled, step 340, then, the microprocessor 30 implements the step 342 of causing the printing structure 50 to be disabled, followed by implementing the successive steps 328, 332, 334, 336 and 338 as hereinbefore discussed. As previously noted, when the solenoid 132 (FIG. 4) is operated, the baffle 170 is positioned for guiding envelopes 18B fed downstream on the deck 17 into engagement with the flap deflecting blade 84, whereas when operation of the solenoid 132 (FIG. 3) is discontinued, the baffle 170 is positioned for guiding such envelopes 18B out as engagement with the flap deflecting blade 84.

In accordance with the objects of the invention there has been described a mailing machine including a process for selectively moistening envelopes fed thereto and, more particularly, a mailing machine base including a process for selectively guiding envelopes toward and away from envelope flap moistening and sealing apparatus. In addition, there has been disclosed a process for selectively guiding envelopes into and out of engagement with envelope flap deflecting structure.

What is claimed is:

1. In a process for operating a mailing machine base including means for feeding an envelope, having a body and a flap, in a downstream path of travel, and including means for deflecting the flap, a process for selectively guiding an envelope into and out of engagement with the flap deflecting means, comprising the steps of:

providing a baffle upstream from the flap deflecting means;

providing electromechanical means for moving the baffle;

providing a microprocessor for controlling the baffle moving means, programming the microprocessor to include a resettable timer having a predetermined time out time interval, programming the microprocessor to cause the timer to start the time out time interval when the baffle is moved out of the path of travel;

programming the microprocessor for normally operating the baffle moving means to move the baffle into the path of travel for guiding an envelope fed therein out of engagement with the flap deflecting means; and programming the microprocessor for selectively operating the baffle moving means to move the baffle out of the path of travel for the duration of the time out time interval so that an envelope fed in the path of travel during the time out time interval will be guided into engagement with the flap deflecting means.

2. The process according to claim 1 including the step of resetting the time-out time interval if an envelope is fed toward the flap deflecting means within the time out time interval.

3. The process according to claim 1 including the step of programming the microprocessor to operate the moving means to move the baffle into the path of travel if an envelope is not fed downstream in the path of travel before the end of the time out time interval.

4. The process according to claim 1 including the step of providing a switch actuatable for causing the microprocessor to operate the baffle moving means to move the baffle out of the path of travel.

5. The process according to claim 1 including the step of providing a switch actuatable for causing the microprocessor to operate the baffle moving means to move the baffle into the path of travel.

6. The process according to claim 1, including the steps of providing a switch and programming the microprocessor to reset the time out time interval in response to actuation of the switch.

7. The process according to claim 1 including the step of initializing the microprocessor to cause the microprocessor to implement the programming which operates the baffle moving means to move the baffle into the path of travel whereby the baffle is normally located in the path of travel.

8. The process according to claim 7 including the steps of providing a switch which is selectively actuatable and programming the microprocessor to reset the time out time interval in response to actuation of the switch.

9. The process according to claim 8 including the step of programming the microprocessor to implement at the end of the time out time interval the step of causing the microprocessor to operate the baffle moving means to move the baffle into the path of travel.

* * * * *